US011637684B2

United States Patent
Stojanovic

(10) Patent No.: US 11,637,684 B2
(45) Date of Patent: Apr. 25, 2023

(54) CLOCK EXTRACTION IN SYSTEMS AFFECTED BY STRONG INTERSYMBOL INTERFERENCE

(71) Applicant: Huawei Technologies Co., Ltd., Shenzhen (CN)

(72) Inventor: Nebojsa Stojanovic, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 13 days.

(21) Appl. No.: 17/314,779

(22) Filed: May 7, 2021

(65) Prior Publication Data

US 2021/0266140 A1     Aug. 26, 2021

Related U.S. Application Data

(63) Continuation of application No. PCT/EP2018/080626, filed on Nov. 8, 2018.

(51) Int. Cl.
| | |
|---|---|
| *H04L 7/00* | (2006.01) |
| *H04L 25/03* | (2006.01) |
| *H04L 27/01* | (2006.01) |

(52) U.S. Cl.
CPC ...... *H04L 7/0058* (2013.01); *H04L 25/03057* (2013.01); *H04L 27/01* (2013.01)

(58) Field of Classification Search
CPC .. H04L 7/0058; H04L 25/03057; H04L 27/01
See application file for complete search history.

(56) References Cited

U.S. PATENT DOCUMENTS

| | | | | |
|---|---|---|---|---|
| 6,028,902 | A * | 2/2000 | Kiyanagi | H04L 7/0054 |
| | | | | 375/373 |
| 9,397,868 | B1 * | 7/2016 | Hossain | H04L 7/0087 |
| 2005/0084046 | A1 * | 4/2005 | Seo | H04L 7/0058 |
| | | | | 375/350 |
| 2005/0135510 | A1 * | 6/2005 | Momtaz | H04L 25/03057 |
| | | | | 375/350 |

FOREIGN PATENT DOCUMENTS

| | | |
|---|---|---|
| CN | 102420790 A | 4/2012 |
| CN | 202261370 U | 5/2012 |
| CN | 104780037 A | 7/2015 |
| CN | 105393487 A | 3/2016 |
| EP | 1786165 A1 * | 5/2007 ........... H04L 7/0083 |
| EP | 3094037 A1 | 11/2016 |
| WO | 2014146708 A1 | 9/2014 |

OTHER PUBLICATIONS

Stojanovic, N. et al, "Volterra and Wiener Equalizers for Short-Reach 100G PAM-4 Applications", Journal of Lightwave Technology, vol. 35, No. 21, Nov. 1, 2017, 12 pages.
(Continued)

*Primary Examiner* — Freshteh N Aghdam
(74) *Attorney, Agent, or Firm* — Paul Christopher Hashim

(57) ABSTRACT

A timing recovery apparatus for signal reception in a data transmission system comprises an equalizer to equalize a received signal and a phase detector connected after the timing recovery equalizer that generates a clock tone from absolute values of the received signal after equalization.

17 Claims, 6 Drawing Sheets

(56) References Cited

OTHER PUBLICATIONS

Mueller, K. et al, "Timing Recovery in Digital Synchronous Data Receivers", IEEE Transactions on Communications, vol. Com-24, No. 5, May 1976, 16 pages.

Sciagura, E. et al, "An efficient and optimized FPGA Feedback M-PSK Symbol Timing Recovery Architecture based on the Gardner Timing Error Detector", 10th Euromicro Conference on Digital System Design Architectures, Methods and Tools (DSD 2007), Aug. 29-31, 2007, 7 pages.

* cited by examiner

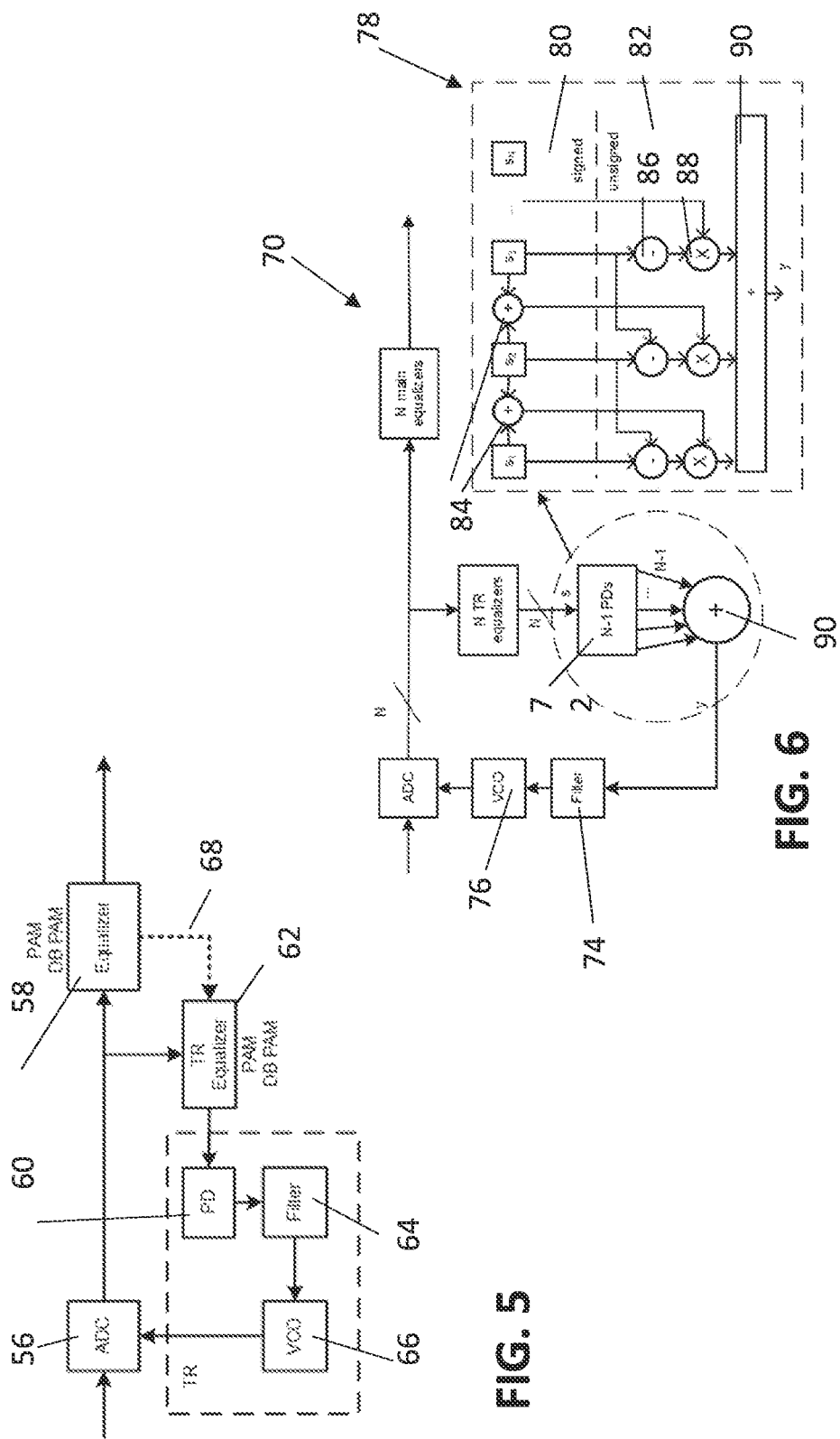

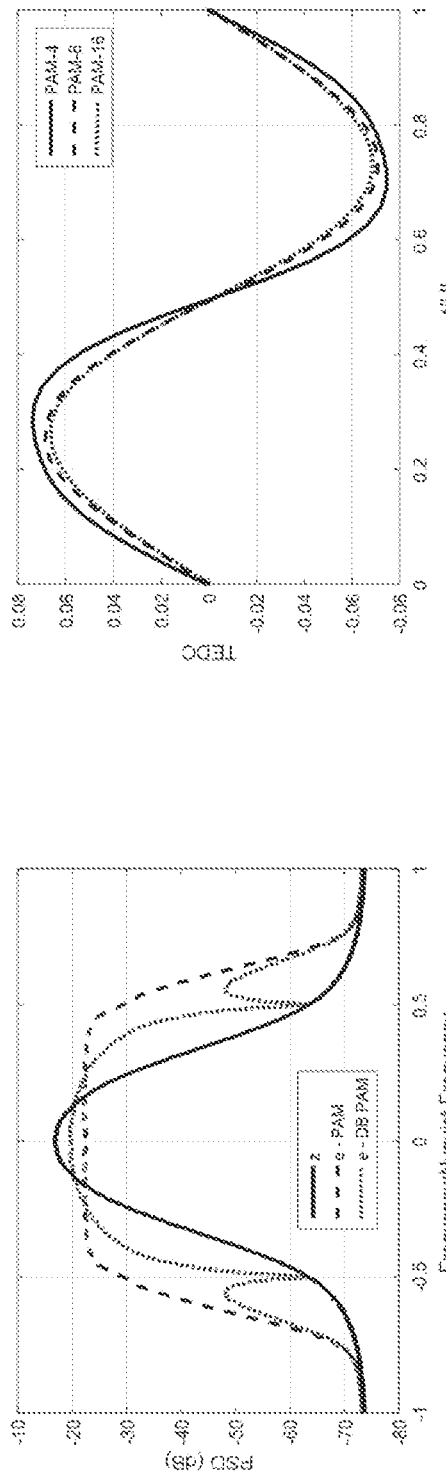
FIG. 9
FIG. 8
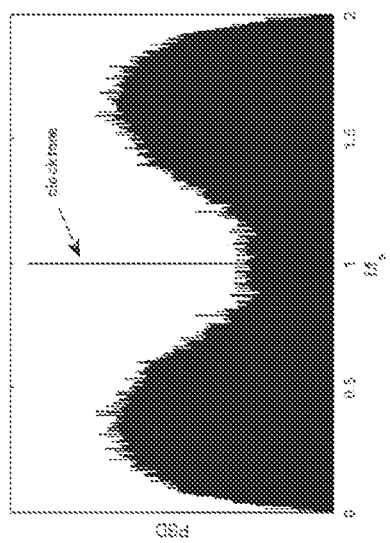
FIG. 10

CLOCK EXTRACTION IN SYSTEMS AFFECTED BY STRONG INTERSYMBOL INTERFERENCE

CROSS-REFERENCE TO RELATED APPLICATIONS

This application is a continuation of International Application No. PCT/EP2018/080626, filed on Nov. 8, 2018, the disclosure of which is hereby incorporated by reference in its entirety.

BACKGROUND

The present invention, in some embodiments thereof, relates to clock extraction in systems affected by strong intersymbol interference and, more particularly, but not exclusively, to timing in FTN PAM-n systems and coherent QAM systems.

Next-generation ultra-high-speed short reach optical fiber links may utilize small, cheap, and low power consumption transceivers, according to requirements which are generally imposed in view of the limited space of data center equipment. The transceivers for such short reach optical links may therefore be expected to support intra- and inter-data center connections over lengths ranging from a few hundred meters up to several tens of kilometers, respectively.

A preferred solution is to transmit 100 Gbit/s per wavelength. However that is very challenging when a very cheap solution is required. The coherent approach is out of scope as it requires high power and expensive devices. Therefore, intensity modulation (IM) and direct detection (DD) schemes are preferred. The mature on-off keying modulation format, widely used in non-coherent systems has also been investigated for applications at 100 Gbit/s per wavelength speed. However, such a solution would require expensive high-bandwidth optics and electronics. To overcome this drawback, advanced modulation formats supported by digital signal processing (DSP) have been investigated as an alternative technology to support 100 Gbits/s, the most promising candidates being duobinary pulse amplitude modulation (DB-PAM-n), discrete multi-tone modulation (DMT), and carrier-less amplitude and phase modulation (CAP). All the aforementioned methods provide similar performance in IMDD systems. However, the DB-PAM formats are more attractive because they require a simple DSP.

Optical transceivers reserved for data centers may typically use cheaper kinds of components such as directly modulated lasers (DML) and electro-absorption modulators (EML). DSP power consumption and latency are critical and only basic DSP functions are implemented in real products. The power of an optical signal is almost proportional to the electrical signal that modulates the laser. Forward-error correction (FEC) is necessary at higher data rates. Error correction codes are often standardized but can also be proprietary.

Reference is now made to FIG. 1, which illustrates an IM-DD PAM transmission system 10. Message bits are inserted into a forward error correction unit 12, and then the bits are mapped into a PAM signal at PAM mapper 14. The PAM signal can be pre-equalized to improve performance at equalizer 16. A digital-to-analog converter (DAC) 18 outputs an analog electrical signal that is often amplified by a modulator driver (MD) 20. EML/DML output provides an optical signal from unit 22, which may suffer from chromatic dispersion (CD) over longer links. Therefore, in some systems dispersion compensation fibers (DCF) or dispersion compensation modules (DCM) 24 are used to compensate for CD. At the receiver side, a photo detector/diode (PDet) 26 detects the optical signal. The PDet output is proportional to the optical signal power. The PDet output is amplified by using a transimpedance amplifier (TIA). PDet and TIA can be integrated in receive optical subassemblies (ROSA) that may include an automatic gain control circuit (AGC) 28 to adjust electrical signal to an analog-to-digital (ADC) 30 input when electronic equalization is used at equalizer 32. The receiver may use a feed-forward equalizer (FFE), a decision feed-back equalizer (DFE), and/or a maximum likelihood sequence estimator (MLSE), or combine some of them to provide equalizer 32, and then demapping of the PAM introduced at PAM mapper 14 is carried out at PAM demapper 34. Of the equalization alternatives for equalizer 32, the FFE suffers from noise enhancement, and the DFE suffers from error multiplication, so that the MLSE is generally regarded as the best solution, although it is also the most complex solution. At the end of the circuit, whatever technology is used to carry out PAM demapping, a hard forward error correction (FEC) device 36 is normally placed after the PAM demapper.

The simplified Rx block diagram including timing recovery blocks is shown in FIG. 2. The AGC block 28 monitors signal power variations and produces an almost constant signal swing that fits into the ADC 30 input range. This way the ADC 30 is effectively used. Sampling phase adjustment circuit (SPA) 38 is discussed below. Equalizer 32 recovers a signal suffering from noise and intersymbol interference (ISI). However, before the equalizer is activated the local oscillator 48 must be locked to the input signal, i.e. to the transmitter oscillator responsible for data clocking. That is to say the transmitter and local oscillators must be synchronized. Small phase deviations are allowed and it is impossible to perfectly track the transmitter clock source. Clock extraction is enabled by a phase detector (PD) 42 that outputs information regarding whether the sampling clock is faster or slower. Since the information is noisy, suffering for example from pattern-dependent noise, noise caused by amplifiers, component imperfections, etc., the timing information must be filtered at filter 46 before entering/controlling the receiver oscillator, often realized as a voltage-controlled oscillator (VCO) 48.

Timing information can be derived from the output signal of analog to digital convertor ADC 30. The timing recovery (TR) block 44 includes PD 42, low-pass filter 46 and VCO 48. VCO 48 clock phase can be adjusted using the sampling phase adjustment (SPA) circuit 38. Sampling phase optimization can be also supported by the FEC decoder 36 that provides a number of FEC input errors (number of corrected errors). The best sampling phase should minimize the number of corrected errors.

IMDD transmission systems can be modeled as presented in FIG. 3. The transmitted signal x is modified by a system transfer function H—block 50—that can be approximated by a linear system. In general, the system is nonlinear. The output signal is a convolution of the signal x and the system pulse response h:

$$y(k) = \sum_{j=-n}^{n} x(k-j)h(j)$$

-continued $$z(k) = y(k) + n(k) = \sum_{j=-n}^{n} x(k-j)h(j) + n(k)$$

where ISI spreads the input signal over 2n+1 symbol intervals. Usually, the transfer function behaves as a low-pass filter and high frequency components can be severely attenuated. An additive noise n additionally disturbs the signal x. The TR block 52 (FIGS. 4a-4c) thus receives a signal suffering from ISI and noise. TR designers are used to counting with a signal that includes noise, and practical TR solutions are thus less sensitive to noise in the specified working conditions. For example, the design of a pre-FEC bit error rate (BER) is directly related to the amount of noise that can be tolerated by the system. However, in systems using enhanced equalization techniques to cope with ISI caused by strong bandwidth limitations of optical and electrical components the received signal contains insufficient clock information. In such systems, all known practical TR schemes fail because the frequency content around the Nyquist frequency is very pure.

In some applications, the DSP power consumption is limited and often only one sample per symbol is available after ADC. Hence all DSP blocks have to work with the minimum number of samples per symbol, which additionally restricts TR design. Therefore, a Mueller and Muller phase detector (MMPD) is used in most DSPs working with a single sample per symbol. The MMPD output for a real binary signal z is described by $$PD_{out}(k)=z(k+T)\text{sign}(z(k))-z(k)\text{sign}(z(k+T))$$

where T denotes a symbol interval. For multilevel signals, the MMPD can use decisions d to give:

$$PD_{out}(k)=z(k+T)d(k)-z(k)d(k+T)$$

Decisions d are generally very weak in ISI channels and the signal z is normally equalized before the TR block.

The equalization may be carried out before the timing recovery TR block 52 which may include PD 42, LPF 46, and VCO 48 as in FIG. 2. Such a scheme is shown in FIG. 4a. In many cases, the equalizer is adaptive and may cause TR instability. Another way to extract a clock is shown in FIG. 4b in a version that might be appropriate for MMPD. When the equalizer is static then such a solution may provide acceptable performance. As with the solution of FIG. 4a, when the equalizer is adaptive, the TR 52 and equalizer 40 together may easily bring the scheme into an unstable region. The main equalizer tap may move to the first or last tap position and the equalizer outputs will be distorted. The best but the most expensive solution uses a TR static equalizer 54 (see FIG. 4c). The TR equalizer 54 may use fewer taps than the main equalizer 40. The signal after the TR equalizer 54 may be much worse than the signal after the main equalizer, so that the MMPD may provide a very noisy clock tone.

A problem with the arrangement of FIG. 4c is how to improve the clock tone and also how to find the best taps for the TR equalizer 54.

Additional background art includes K. H. Mueller and M. S. Muller, "Timing Recovery in Digital Synchronous Data Receivers", IEEE Transactions on Communications, Vol. 24, 1976, pp. 516-531.

SUMMARY OF THE INVENTION

The present embodiments may introduce a new phase detector, and an algorithm for setting the TR equalizer taps, so as to obtain a more accurate clock tone. The embodiments may provide a method for clock extraction in strongly bandwidth limited transmission systems and in systems with high ISI. A method according to the present embodiments may use simple operations with a low number of samples to recover the transmitter clock.

According to an aspect of some embodiments of the present invention there is provided timing recovery apparatus for signal reception in a data transmission system, the apparatus comprising: an equalizer configured to equalize a received signal and to output an equalized signal; and a phase detector configured to receive the equalized signal and configured to generate a clock tone from absolute values of the equalized signal, wherein the clock tone provides phase information for timing recovery.

In an embodiment, the equalized signal comprises N symbols, with N being an integer equal or greater than 2, and wherein the phase detector comprises (N−1) adder, (N−1) subtractor and (N−1) multiplier for the incoming symbols to produce (N−1) symbol outputs.

An embodiment may comprise a general adder for adding together a plurality of the symbol outputs to generate a phase detector output.

In an embodiment, the adder sum up a signed part of the symbol samples and the subtractor sum up the unsigned part of the symbol samples.

In an embodiment, the phase detector is configured to produce a $k^{th}$ output $$PD_{out}(k)=\text{abs}[z(k)+z(k+T)][\text{abs}(z(k))-\text{abs}(z(k+T))]$$

where T is a symbol interval, and z(k) is the incoming symbol sample.

In an embodiment, the equalizer comprises a main equalizer and a timing recovery, TR, equalizer.

In an embodiment, the main equalizer and the TR equalizer are respectively switchable between a PAM mode and DB PAM mode.

In an embodiment, the main equalizer is an adaptive equalizer.

In an embodiment, the TR equalizer is configured with a standard performance setting wherein the TR equalizer operates in the same mode as the main equalizer, and an enhanced performance setting wherein the TR equalizer operates in PAM mode regardless of a mode of the main equalizer.

In an embodiment, the main equalizer and the TR equalizer comprise tap settings, the tap settings being updatable, and wherein the main equalizer is configured to provide at least some of its tap settings as tap updates to the TR equalizer.

In an embodiment, the main equalizer is configured to operate initially in PAM mode and provide a set of tap updates to the TR equalizer, and subsequently to operate in DB-PAM mode and not to provide updates to the TR equalizer if the TR equalizer is in PAM mode.

In an embodiment, the TR equalizer is configured to use a set of default tap values until a first tap update is received from the main equalizer.

Embodiments may comprise a microcontroller connected to provide slow tap updates for the TR equalizer.

In embodiments, the data transmission system comprises optical transmission.

In an embodiment, a transmitted signal is a PAM-n signal.

In an embodiment, a transmitted signal is a coherent QAM signal.

According to a second aspect of the present invention there is provided a timing recovery method for signal reception in a data transmission system, the method comprising: equalizing a received signal; and detecting phase and generating a clock tone using absolute values of the received signal after equalization.

The method may comprise carry out for each received symbol a single addition, a single subtraction and a single multiplication to produce a symbol output.

The method may comprise adding together a plurality of the symbol outputs to provide the phase detecting and the clock tone.

The method may comprise compensating for slow channel changes by using a microcontroller to provide slow tap updates for the TR equalizer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve hardware, software or firmware or a combination thereof, in some cases using an operating system.

For example, hardware for performing selected tasks according to embodiments of the invention could be implemented as a chip or a circuit. As software, selected tasks according to embodiments of the invention could be implemented as a plurality of software instructions.

BRIEF DESCRIPTION OF THE DRAWINGS

Some embodiments of the invention are herein described, byway of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5 is a simplified block diagram showing a device in an optical link according to an embodiment of the present invention;

FIG. 6 is a simplified block diagram showing in greater detail the phase detection part of the device of FIG. 5;

FIG. 8 is a graph showing spectra of a received quantized signal z in a bandwidth-limited system that enters the equalizer, specifically, spectra of three signals, signal z prior to entering the equalizer, and two output signals, an e-PAM output signal and an e-DBPAM signal;

FIG. 9 is a simplified graph that illustrates timing error detector characteristics (TEDC) over one unit interval (UI)/symbol period for three different PAM formats, PAM-4, PAM-8 and PAM-16 for an embodiment of the present invention;

FIG. 10 is a graph indicating frequency f/fs against power spectral density PSD, and thus showing the clock tone generated by an embodiment of the present invention.

DETAILED DESCRIPTION OF ILLUSTRATIVE EMBODIMENTS

Figure 1:
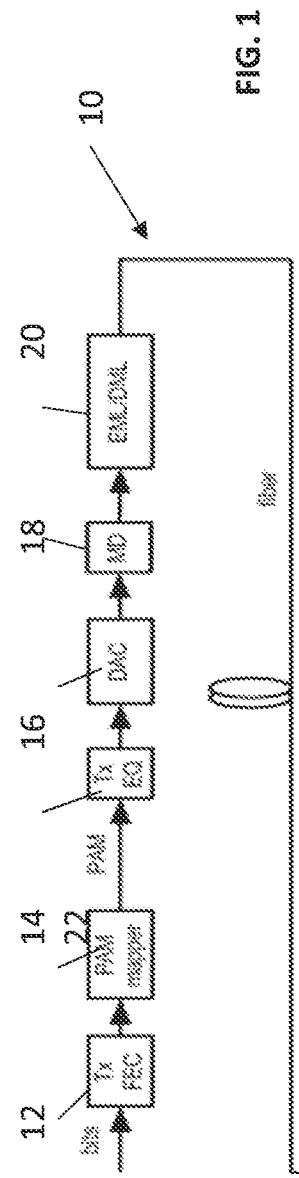
FIG. 1 is a simplified diagram of a transmitter in an optical link.
Figure 2:
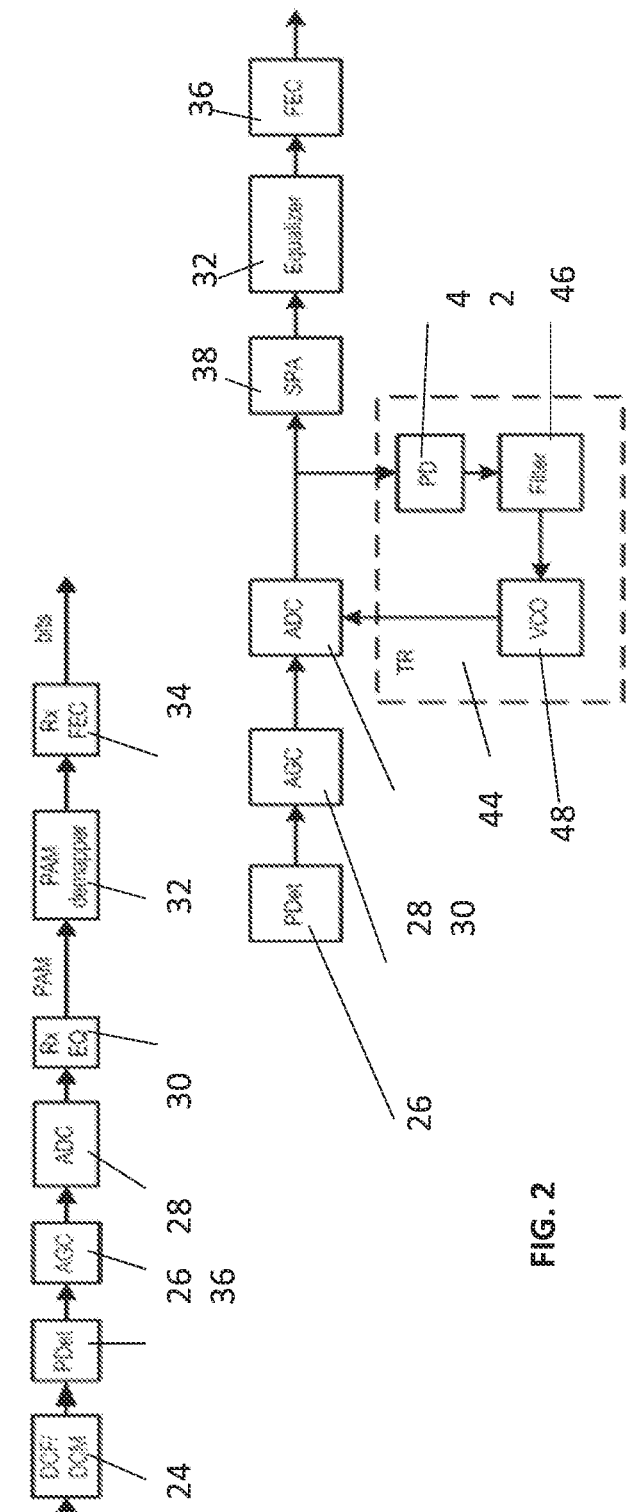
FIG. 2 is a simplified diagram of a receiver in an optical link.
Figure 3:
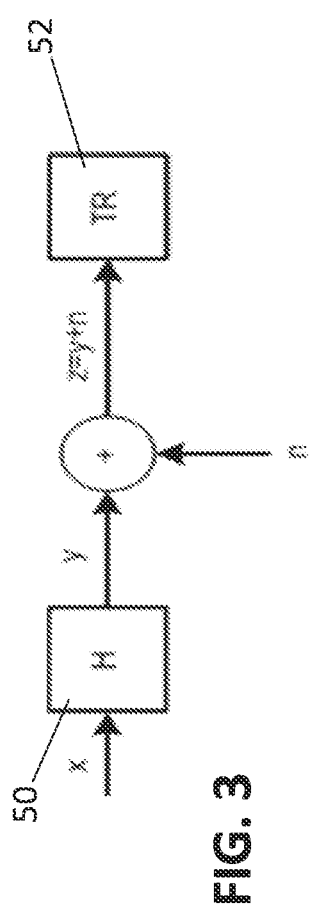
FIG. 3 is a simplified diagram showing a transfer function that may be used by an optical link with noise.
Figure 4C:
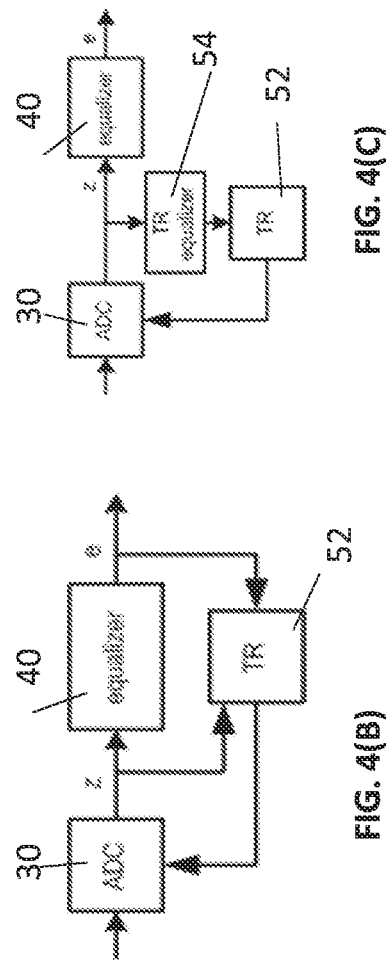
FIGS. 4A-4C are three different ways of connecting up a transmitter to improve performance.
Figure 4B:
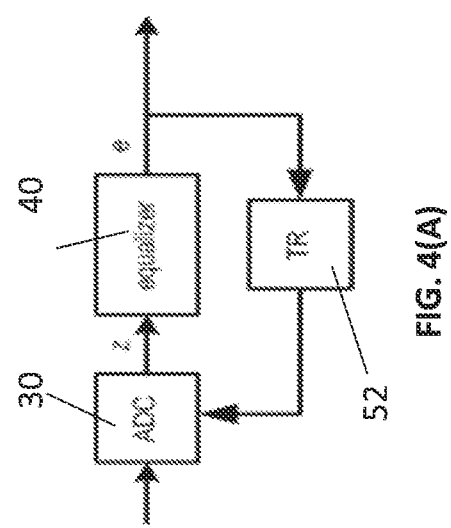
Figure 4A:
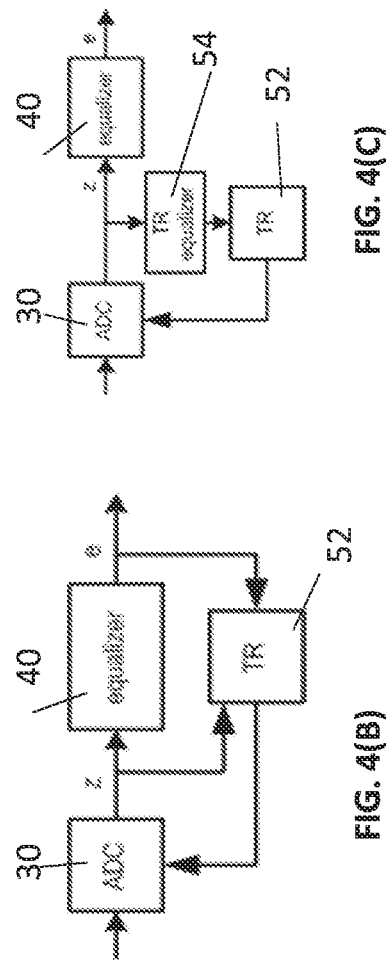

The present invention, in some embodiments thereof, relates to clock extraction in systems affected by strong intersymbol interference and, more particularly, but not exclusively, to timing in FTN PAM-n systems and coherent QAM systems.

Embodiments of the present invention provide a method for clock derivation in PAM-n transmission systems that are seriously degraded by ISI caused by bandwidth limitations of system electrical and optical components. Certain of the present embodiments may provide one or more of the following benefits:

1. A phase detector according to the present embodiments may use one sample per symbol that enables clock extraction at very high baud rates with very low complexity.

2. Embodiments may require just two adders and a multiplier per symbol. Additionally, the sample sign may be ignored.

3. A phase detector according to the present embodiments may enable timing in high-speed systems where the PAM-n signal is equalized. The phase detector may use either its own short pre-equalizer or take the outputs from the main equalizer where the phase detector sampling phase is carefully handled to avoid unstable behavior.

4. The phase detector may be modified and used in other systems such as e.g. coherent QAM systems.

For purposes of better understanding some embodiments of the present invention, as illustrated in FIGS. 5-11 of the drawings, reference has already been made in the background to the construction and operation of an existing transmitter and receiver system as illustrated in FIGS. 1-4c.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

In strongly bandwidth-limited systems the signal spectrum at high frequencies is very weak, although the signal at these frequencies can be recovered by equalization. Also, a system can control ISI so that the equalizer output may have more levels than the transmitted signal. One example is duobinary transmission. In duobinary systems, the PAM-N signal has 2N−1 levels after equalization. This signal has a weak high-frequency content but it can be used in a suitable TR algorithm to extract clock tone. Extracting clock tone can also be done by the Mueller and Muller phase detector MMPD. However, the MMPD may generate a strong self-jitter.

Referring now to FIG. 5, a simplified block diagram of a timing recovery device is shown, that uses a timing recovery equalizer for signal reception in an optical data transmission system according to the present embodiments.

In FIG. 5, numeral 62 indicates the timing recovery equalizer and numeral 60 indicates a phase detector. The output of the phase detector 60 is filtered by a filter 64 and the filtered output provides the input to local oscillator VCO 66 to produce the clock tone of FIG. 10.

As shown in FIG. 5, the signal arrives at ADC 56 and the output of the ADC is fed to PAM-DBPAM main equalizer 58. Phase detector 60 uses the signal from the timing recovery (TR) equalizer 62. The TR equalizer 62 may be simpler than the main equalizer 58. The main 58 and TR 62 equalizers may work in either or both of two modes PAM and DB PAM. When the main equalizer 58 works in the PAM mode the TR equalizer 62 may also work in the PAM mode. However, when the main equalizer 58 works in the DB PAM mode the TR equalizer 62 may work in either mode, and it is noted that the PAM mode generates less jitter.

On the other hand, in time varying channels the main equalizer 58 tracks channel changes and these changes may be periodically applied in the TR equalizer, by changing equalizer taps. The TR tap updates may require some care so as not to destabilize the system, and specifically, a problem arises from the fact that if the main equalizer 58 works in the DB PAM mode, the TR equalizer taps cannot be updated in the PAM mode. Thus, in the case of time-varying channels it is recommended that the two equalizers work in the same mode. Dotted arrow 68 indicates that main equalizer 58 may set the mode of TR equalizer 62 and may provide tap updates.

Equalizer 58, 62 may equalize a received signal and output an equalized signal. The equalizer may comprise two equalizer parts or two equalizers connected together via a control connection 68. Equalizer 58 is a main equalizer and equalizer 62 is a timing recovery equalizer.

The control connection 68 allows the main equalizer to set a mode and/or set taps for the timing recovery equalizer.

A phase detector 60 may receive the equalized signal from the timing recovery equalizer 62 and generate a clock tone from absolute values of the equalized signal. The clock tone thus provides phase information for timing recovery.

Reference is now made to FIG. 6, which is a simplified block diagram of an implementation on an ASIC of a timing recovery and phase detection part of the device of FIG. 5. In ASIC 70, data are processed in blocks of N symbols in parallel so as to achieve the Baud rate. Therefore, NPDs 72 are executed in a single ASIC clock cycle. The TR filter 74 and VCO 76 are clocked using the ASIC clock. The PD shown in greater detail as insert 78 has a signed region 80 where two neighboring samples are summed at summers 84. In unsigned part 82, the data sign is irrelevant, and one subtraction, at subtractor 86, and multiplication, at multipliers 88, are executed. Later, N outputs are summed up at summer 90 and fed into the TR filter 74 to smooth the sampling phase variations.

Thus the device may have N−1 phase detectors 72 and subsequent branching including adders and multipliers. The main equalizer may easily have between 30 and 200 taps, and may adapt to current situations. The output contains the reconstructed signal.

The TR equalizer may have say five taps, and in embodiments these may take on default values which are not changed. If the taps in the TR equalizer were to change then the signal after the main equalizer may become unstable, as discussed above, so it is easier to keep the TR taps fixed and carry out the changes at the main equalizer. The default values may for example be set at the factory, or an alternative is to take five taps from the main equalizer to acquire the clock. Such a procedure need only be performed once.

In FIG. 6, the equalized signal is made up of, or to be more precise dealt with in blocks of, N symbols, with N being an integer equal or greater than 2. The phase detector, 60, 72, comprises (N−1) adders 84, (N−1) subtractor 86, and (N−1) multipliers 88 for the incoming symbols to produce (N−1) symbol outputs. Typically one sample per symbol is taken.

A general adder 90 may add together the symbol outputs to generate a phase detector output.

The adders 84 may sum up a signed part 80 of the symbol samples, whereas the subs tractors 86 may sum up the unsigned part 82 of the symbol samples.

The phase detector is configured to produce a $k^{th}$ output $$PD_{out}(k)=abs[z(k)+z(k+T)][abs(z(k))-abs(z(k+T))]$$

where T is a symbol interval, and z(k) is the symbol sample after the TR equalizer.

As discussed above, the equalizer comprises a main equalizer and a timing recovery, TR, equalizer.

In embodiments the main equalizer 58 and the TR equalizer 62 are each switched between a PAM mode and DB PAM mode. Furthermore, the main equalizer 58 may be an adaptive equalizer. The TR equalizer may have a standard performance setting wherein the TR equalizer operates in the same mode as the main equalizer, and an enhanced performance setting wherein the TR equalizer operates in PAM mode regardless of the mode of the main equalizer. The control connection 68 ensures that the TR equalizer may be set by the main equalizer to the appropriate mode.

The main equalizer 58 and the TR equalizer 72 may each have tap settings which are updated. As mentioned above, the main equalizer 58 may provide at least some of its tap settings as tap updates to the TR equalizer via the control connection 68.

More particularly, the main equalizer 58 may operate initially in PAM mode and provide a set of tap updates to the TR equalizer 62. Subsequently the main equalizer may operate in DB-PAM mode and at this point cease to provide updates to the TR equalizer if the TR equalizer is in PAM mode. However it may continue to provide updates if both are operating in DB-PAM mode.

The TR equalizer may initialize with a set of default tap values which it may continue to use until a first tap update is received from the main equalizer.

The timing recovery apparatus may include a microcontroller connected to provide slow tap updates for the TR equalizer.

The data transmission system may be an optical transmission system.

The transmitted signal may for example be a PAM-n signal, or a coherent QAM signal.

Figure 7:
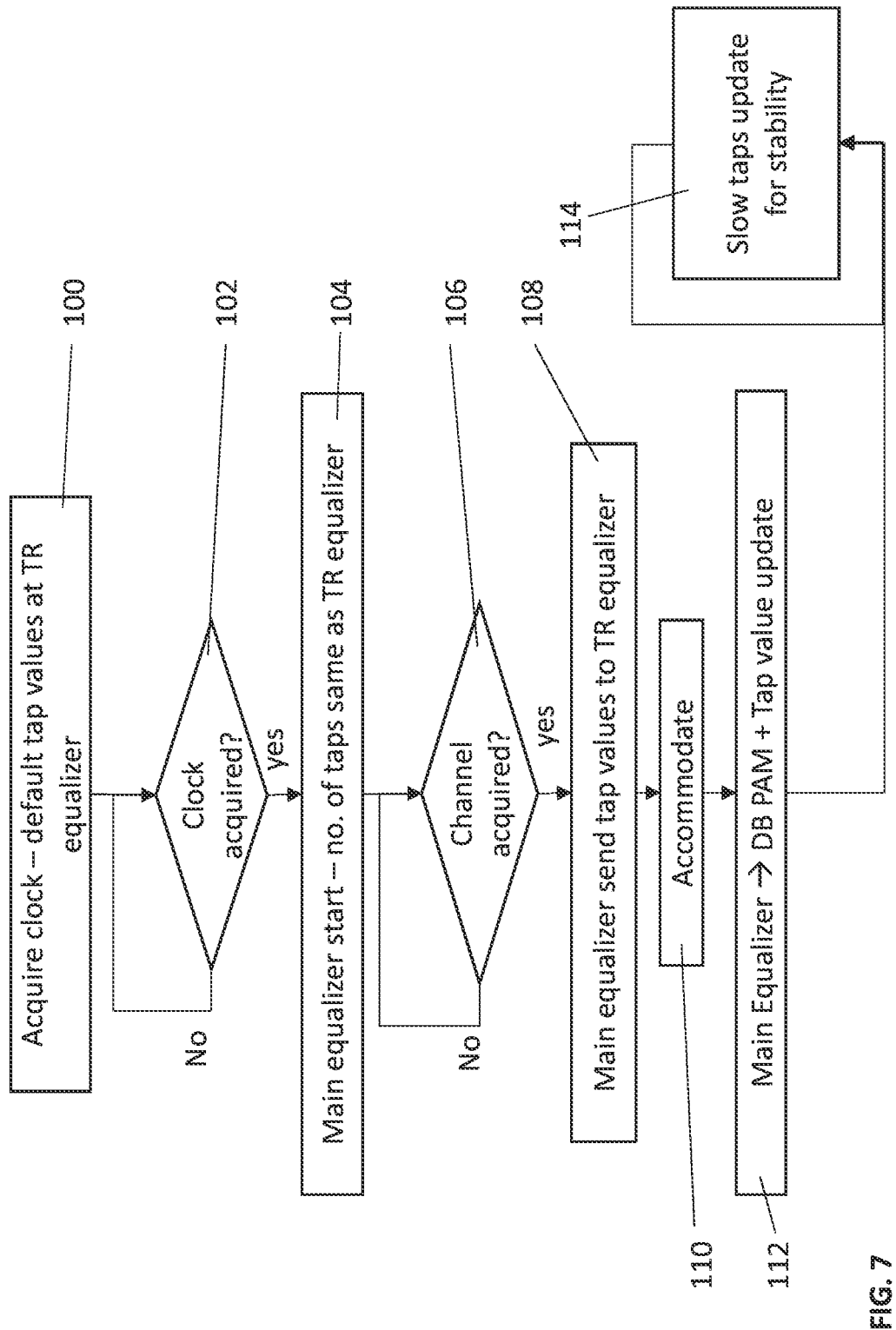
FIG. 7 is a simplified flow chart showing a procedure for clock acquisition and setting of taps according to an embodiment of the present invention.

Reference is now made to FIG. 7, which illustrates a starting procedure for detection according to the present embodiments, according to which the taps in the TR equalizer may be set and updated. When enhanced timing recovery (TR) performance is required but the main equalizer happens to be operating in the DB PAM mode, the starting procedure may go through the following procedure:

The starting/default TR equalizer taps are used to acquire 100 the clock. When the TR works well, that is the clock has been acquired 102, the main equalizer starts updates in the PAM mode 104.

The TR equalizer may have less taps than the main equalizer. In this case, the main equalizer may at this point use the same number of taps as the TR equalizer.

After channel acquiring 106, the main equalizer sends its tap values to the TR equalizer 108.

Once the taps are updated at the TR equalizer, the TR equalizer works for some time to accommodate to new conditions 110.

When the clock is stable the main equalizer switches to the DB mode 112 and does taps updates. The TR equalizer taps are not updated from this point onwards from the main equalizer.

Thus a stable transmission situation is arrived at, and from now on, slow updates may be carried out 114, for example using a micro controller that tracks slow channel changes such as temperature, aging etc. The slow changes may be carried out with due care in order to keep the system stable.

As shown in FIG. 7, the present embodiments may provide a recovery method for signal reception in a data transmission system. A received signal is equalized, and a phase of the equalized signal is detected to generate a clock tone. The clock tone may use absolute values of the received signal after equalization.

The method may involve sampling the received signals and carrying out for each received symbol a single addition, a single subtraction and a single multiplication to produce a symbol output.

The method may involve adding together a plurality of symbol outputs to provide the phase detection and thus obtain the clock tone.

The phase detecting may comprise producing a $k^{th}$ output:

$$PD_{out}(k)=abs[z(k)+z(k+T)][abs(z(k))-abs(z(k+T))]$$

where T is a symbol interval, and z(k) is the incoming symbol sample.

Reference is now made to FIG. 8, which is a graph showing a spectrum of a received quantized signal z in a bandwidth-limited system that enters the equalizer. Specifically, FIG. 8 shows spectra of three signals, signal z prior to entering the equalizer, and two output signals, an e-PAM output signal and an e-DBPAM signal. The signal z is thus equalized by two types of equalizers. The first one delivers a PAM signal (e-PAM) while the second one outputs DB PAM signal (e-DB PAM). In this case, because the first (e-PAM) equalizer enhances the noise at high frequencies the DB PAM signal may provide better bit error rate (BER) performance. However, the TR performance is better with a PAM reconstructed signal, and indeed it is known that the performance of some PDs decreases as the number of PAM levels increases. Also, MMPD PAM8 performance is worse than MMPD PAM4 performance. Additionally, the MMPD without decisions, meaning where only a sign is used, can cause unstable hang up regions. More particularly, a sampling phase may track over some period of time in such an unstable region and later reach a stable sampling point. Thus allows one to simply use the unstable region instead of stopping. To explain consider the graph of TEDC in FIG. 9, and assume that the TEDC from 0.2 to 0.8 is almost zero. If an incoming sample is at say a sampling point close to 0.4 it will take some time to bring the sampling phase to the position 0, where 0 is a stable sampling point. Without this unstable hang up region the TR would rapidly bring the sampling point from the position 0.4 to 0.

The present embodiments use a phase detector whose output is described by $$PD_{out}(k)=abs[z(k)+z(k+T)][abs(z(k))-abs(z(k+T))]$$

where T denotes a symbol period. The equation uses an absolute value function—abs—in order to extract the timing. The input signal is at or close to the Nyquist frequency and the absolute value function makes the frequency more distinct and allows amplification of the frequency containing the timing. The timing information according to the present formula is extracted from a single current sample. Prior art systems have attempted to use squaring or fourth powers but have used summing based on other samples, thus complicating the circuitry and adding jitter.

Reference is now made to FIG. 9, which is a simplified graph that illustrates timing error detector characteristics (TEDC) over one unit interval (UI)/symbol period for three different PAM formats, PAM-4, PAM-8 and PAM-16. The signal power is normalized to 1. One can see that TEDC barely depends on the PAM format, the three different PAM formats all giving practically the same response. The function is symmetrical and has a sinusoidal shape. The TEDC does not have hang up regions.

The phase detector of the present embodiments generates a clock tone such as indicated in FIG. 10 which is a graph indicating frequency f/fs against power spectral density PSD. The ratio of clock tone to noise is improved compared to the MMPD by several dBs, depending on noise and system transfer function. In channels with strong ISI and when a TR equalizer is used, the phase detector of the present embodiments may provide improved performance compared to some known PDs based either on single or two samples per symbol.

Figure 11:
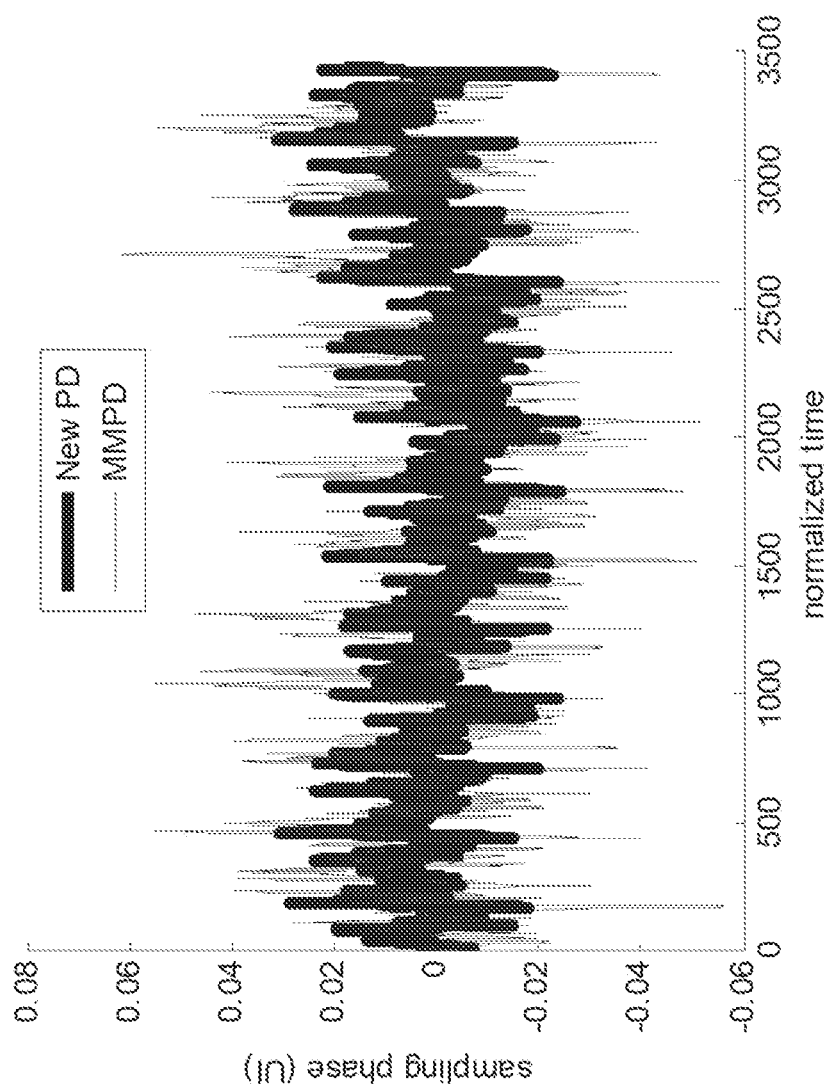
FIG. 11 is a graph that illustrates results when 75 GBaud PAM-8 experimental data are processed according to an embodiment of the present invention.

Reference is now made to FIG. 11, which illustrates results when 75 GBaud PAM-8 experimental data are processed (IMDD setup). A 21-tap FFE was used for TR pre-equalization. The TR loop was set to 4 MHz. Sampling phase variations for the PD of the present embodiments and by comparison with the prior art MMPD are shown. The maximum sampling variations are doubled by the MMPD and they are more than 0.1 UI (Jpp-jitter peak-to-peak). On the other hand, the PD of the present embodiments shows variations that do not cross 0.05 UI (Jpp).

It is expected that during the life of a patent maturing from this application many relevant optical channel technologies, equalization schemes and noise reduction schemes will be developed, and channel rates and Baud rates will increase, and the scopes of the terms and rates given herein are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An apparatus, comprising:
an equalizer comprising a main equalizer and a timing recovery (TR) equalizer, the main equalizer and TR equalizer being respectively switchable between a pulse amplitude modulation (PAM) mode and a duo-binary pulse amplitude modulation (DB PAM) mode, the equalizer being configured to:
equalize a received signal, to form an equalized signal; and
output an equalized signal; and
a phase detector, configured to:
receive the equalized signal; and
generate a clock tone from absolute values of the equalized signal, wherein the clock tone provides phase information for timing recovery.

2. The apparatus of claim 1, wherein the equalized signal comprises N symbols, N is an integer equal or greater than 2, and wherein the phase detector comprises an (N−1) adder, an (N−1) subtractor, and an (N−1) multiplier, and the (N−1) adder, the (N−1) subtractor, and the (N−1) multiplier are configured to produce (N−1) symbol outputs by performing an addition, a subtraction, and a multiplication on each symbol of the N symbols.

3. The apparatus of claim 2, further comprising:
a general adder, configured to add together a plurality of symbol outputs of the (N−1) symbol outputs, to generate a phase detector output.

4. The apparatus of claim 2, wherein the (N−1) adder is configured to sum up a signed part of symbol samples of the N symbols, and the (N−1) substractor is configured to sum up an unsigned part of the symbol samples.

5. The apparatus of claim 1, wherein the phase detector is configured to produce a $k^{th}$ output $PD_{out}(k)$ according to the following relation:

$$PD_{out}(k)=\text{abs}[z(k)+z(k+T)][\text{abs}(z(k))-\text{abs}(z(k+T))]$$

where T is a symbol interval, and z(k) is the incoming symbol sample.

6. The apparatus of claim 1, wherein the main equalizer is an adaptive equalizer.

7. The apparatus of claim 6, wherein the TR equalizer is configured with a standard performance setting, wherein the TR equalizer operates in a same mode as the main equalizer and the TR equalizer is configured with an enhanced performance setting providing for TR equalizer operation in PAM mode independently of a mode of the main equalizer.

8. The apparatus of claim 7, wherein the main equalizer and the TR equalizer are configured to determine tap settings, the tap settings are updatable, and wherein the main equalizer is configured to provide at least some of the tap settings as tap updates to the TR equalizer.

9. A method, comprising:
equalizing, by an equalizer, a received signal to form an equalized signal comprising at least one symbol;
performing a single addition, a single subtraction, and a single multiplication, to produce a symbol output for each symbol of the equalized signal; and
detecting a phase and generating a clock tone, by a phase detector, using absolute values of the equalized signal.

10. The method of claim 9, further comprising:
adding together a plurality of the symbol outputs to provide a phase detector output and the clock tone.

11. The method of claim 9, wherein the phase detecting comprises producing a $k^{th}$ output $PD_{out}(k)$ according to the following relation:

$$PD_{out}(k)=\text{abs}[z(k)+z(k+T)][\text{abs}(z(k))-\text{abs}(z(k+T))]$$

where T is a symbol interval, and z(k) is the incoming symbol sample.

12. The method of claim 9, wherein the equalizing comprises main equalizing and timing recovery (TR) equalizing.

13. The method of claim 12, wherein the main equalizing and the TR equalizing are respectively performed in a pulse amplitude modulation (PAM) mode or a duobinary pulse amplitude modulation (DB PAM) mode.

14. The method of claim 13, wherein the main equalizing is performed adaptively.

15. The method of claim 14, wherein the TR equalizing is performed using a standard setting for operating in a same mode as the main equalizing or is performed using an enhanced performance setting for operating in PAM mode independently of a mode of the main equalizing.

16. The method of claim 15, wherein the main equalizing and the TR equalizing respectively use taps, each tap having a respective tap setting, the method comprises providing at least some tap settings from the main equalizing as tap updates to the TR equalizing.

17. The method of claim 16, wherein:
in a first time period, the main equalizing is initially performed in PAM mode and provides a set of tap updates to the TR equalizing; and
in a second time period, the main equalizing operates in DB-PAM mode and the TR equalizing operates in PAM mode, and the main equalizing no longer provides tap updates to the TR equalizing.

* * * * *